(12) United States Patent
Kim et al.

(10) Patent No.: US 10,509,796 B2
(45) Date of Patent: Dec. 17, 2019

(54) APPARATUS FOR VISUALIZING DATA AND METHOD FOR USING THE SAME

(71) Applicant: ELECTRONICS AND TELECOMMUNICATIONS RESEARCH INSTITUTE, Daejeon (KR)

(72) Inventors: Hyun-Joo Kim, Daejeon (KR); Jong-Hyun Kim, Daejeon (KR); Ik-Kyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 221 days.

(21) Appl. No.: 15/860,828

(22) Filed: Jan. 3, 2018

(65) Prior Publication Data
US 2018/0210930 A1    Jul. 26, 2018

(30) Foreign Application Priority Data

Jan. 25, 2017    (KR) .................. 10-2017-0012135

(51) Int. Cl.
*G06F 16/248*    (2019.01)
*G06F 8/34*    (2018.01)
*G06K 9/62*    (2006.01)
*G06F 16/2458*    (2019.01)

(52) U.S. Cl.
CPC ............. *G06F 16/248* (2019.01); *G06F 8/34* (2013.01); *G06F 16/2474* (2019.01); *G06K 9/62* (2013.01); *G06T 2200/04* (2013.01); *G06T 2200/08* (2013.01)

(58) Field of Classification Search
CPC ........ G06K 9/46; G06K 9/62; G06T 2200/04; G06T 2200/08; G06F 8/34; G06F 11/32; G06F 11/323; G06F 16/2474; G06F 16/248; G06F 2201/86
See application file for complete search history.

(56) References Cited

U.S. PATENT DOCUMENTS

| | | | |
|---|---|---|---|
| 6,219,826 B1 * | 4/2001 | De Pauw et al. | G06F 11/323 714/E11.181 |
| 7,456,831 B2 | 11/2008 | Chu et al. | 345/420 |
| 7,716,169 B2 | 5/2010 | Park et al. | 707/103 Z |
| 2017/0272454 A1 | 9/2017 | Seo et al. | H04L 63/1416 |

FOREIGN PATENT DOCUMENTS

| | | |
|---|---|---|
| KR | 10-2015-0013416 A | 2/2015 |
| KR | 10-1544322 B1 | 8/2015 |
| KR | 10-1558652 B1 | 10/2015 |
| KR | 10-1628314 B1 | 6/2016 |

* cited by examiner

*Primary Examiner* — Andrew W Johns
(74) *Attorney, Agent, or Firm* — LRK Patent Law Firm (57) ABSTRACT

An apparatus and method for visualizing data. The apparatus for visualizing data includes a behavior information collection unit for executing an application from which information is to be collected and collecting behavior information from a process of the executed application, a behavior feature extraction unit for extracting behavior features in an order in which the behavior information is called, a behavior sequence generation unit for generating a behavior sequence by arranging the behavior features in chronological order, and a behavior sequence visualization unit for visualizing the behavior sequence as a 3D sequence object.

20 Claims, 11 Drawing Sheets

APPARATUS FOR VISUALIZING DATA AND METHOD FOR USING THE SAME

CROSS REFERENCE TO RELATED APPLICATION

This application claims the benefit of Korean Patent Application No. 10-2017-0012135, filed Jan. 25, 2017, which is hereby incorporated by reference in its entirety into this application.

BACKGROUND OF THE INVENTION

1. Technical Field

The present invention relates generally to technology for visualizing data, and more particularly to technology for data analysis, data pattern detection, and sequential data visualization.

2. Description of Related Art

Data visualization technology relates to the process of visually representing and delivering data analysis results in order to help people easily understand the same, and aims to clearly and effectively deliver information using various methods.

These days, people are exposed to infinite amounts of data through image media, digital media, social network services, cloud services, and the like, and in order to adapt to such a change of the environment, methods of representing and accommodating data are required to change. That is, data visualization is increasingly required in order to efficiently and clearly provide a large amount of data. Recently, with the development of big-data technology markets, technology for representing big data becomes more important.

Existing technology for visualizing data is configured to show statistics about system logs and analysis results using graphs or charts, but recent technology for visualizing big data focuses on a visualization method for summarizing big data and intuitively and clearly characterizing the same because it is difficult to provide all of various types of information.

Currently, a method for visualizing sequential data mainly uses colors and text. A method using a color spectrum in which sequential data are represented using colors distinguished depending on brightness or color differences, a method for assigning different colors to respective characters and representing sequential data using text (mainly used to detect a protein sequence in biotechnology), a time-series graph, and the like are widely used. In the case of the method using a color spectrum, with the increase in the number of types of data features that constitute sequential data, the division of colors that are visually recognizable by humans becomes less distinct, and it becomes more difficult to detect the form of sequential data. In the case of the method of representing sequential data in text, it is easy to understand sequential data when the length thereof is short, but it is difficult to visually characterize or compare data when the length of the sequential data is long.

Meanwhile, Korean Patent Application Publication No. 10-2015-0013416, titled "Apparatus for analyzing data through data visualization and method thereof" discloses an analysis apparatus and method using data visualization, in which, using n triangles, multiple pieces of data are visualized and represented as a single image in order to quickly and intuitively detect the overall or detailed flow of large amounts of data and in which triangular visualization models are configured using categorized data, numerical data, weights and colors and selected data are refined using a filter module and a visual conversion module.

SUMMARY OF THE INVENTION

An object of the present invention is to specify a behavior sequence by visualizing the behavior sequence of sequential data.

Another object of the present invention is to provide a method for representing a behavior sequence of data as a 3D object in order to intuitively determine the similarity between behavior sequences.

A further object of the present invention is to provide a means for detecting malicious code between sequences by visualizing a unique behavior sequence pattern of malicious code in the field of malicious code classification and detection.

In order to accomplish the above objects, an apparatus for visualizing data according to an embodiment of the present invention includes a behavior information collection unit for executing an application from which information is to be collected and collecting behavior information from a process of the executed application; a behavior feature extraction unit for extracting behavior features in an order in which the behavior information is called; a behavior sequence generation unit for generating a behavior sequence by arranging the behavior features in chronological order; and a behavior sequence visualization unit for visualizing the behavior sequence as a 3D sequence object.

Here, the behavior information collection unit may collect the behavior information related to behavior through which the process calls an Application Programming Interface (API).

Here, the apparatus may further include a database unit for storing a behavior feature that is defined so as to correspond to the API.

Here, the behavior information collection unit may collect the behavior information using an API hooking method.

Here, the behavior sequence visualization unit may include a feature object generation unit for generating a 3D object corresponding to the behavior features; and a feature object connection unit for generating the 3D sequence object by connecting two or more 3D objects based on the behavior sequence.

Here, the feature object generation unit may generate a 3D object of an n-hedron (n is a natural number that is equal to or greater than 4) so as to correspond to a number (n) of behavior features.

Here, the feature object generation unit may map the behavior features to respective faces of the 3D object.

Here, the feature object generation unit may set any one of vertices of the 3D object as a first point, which is equally applied to all of the two or more 3D objects.

Here, the feature object generation unit may set a center point of a face to which a behavior feature of the behavior sequence is mapped, among the faces of the 3D object, as a second point.

Here, the feature object generation unit may generate color values for the behavior features mapped to the respective faces of the 3D object.

Here, the feature object generation unit may generate the 3D object using color values corresponding to the behavior features.

Here, the feature object connection unit may connect an origin of a 3D coordinate system with the first point of the 3D object, based on the behavior sequence, using a connecting line.

Here, based on the behavior sequence, the feature object connection unit may connect the second point of a previous 3D object with the first point of a 3D object subsequent thereto, among the two or more 3D objects, using the connecting line.

Here, the feature object connection unit may detect behavior pattern information for 3D objects having a same behavior sequence corresponding to a connection of the two or more 3D objects in the 3D sequence object.

Here, the feature object connection unit may visualize the behavior pattern information based on a connection angle at which the two or more 3D objects are connected.

Also, in order to accomplish the above objects, a method for visualizing data, in which an apparatus for visualizing data is used, according to an embodiment of the present invention includes executing an application from which information is to be collected and collecting behavior information from a process of the executed application; extracting behavior features in an order in which the behavior information is called; generating a behavior sequence by arranging the behavior features in chronological order; and visualizing the behavior sequence as a 3D sequence object.

Here, visualizing the behavior sequence may include generating a 3D object corresponding to the behavior features; and generating the 3D sequence object by connecting two or more 3D objects based on the behavior sequence.

Here, generating the 3D object may be configured to set any one of vertices of the 3D object as a first point, which is equally applied to all of the two or more 3D objects.

Here, generating the 3D object may be configured to set a center point of a face to which a behavior feature of the behavior sequence is mapped, among respective faces of the 3D object, as a second point.

Here, generating the 3D sequence object may be configured to connect an origin of a 3D coordinate system with the first point of the 3D object, based on the behavior sequence, using a connecting line.

Here, generating the 3D sequence object is configured to connect the second point of a previous 3D object with the first point of a 3D object subsequent thereto, among the two or more 3D objects, using a connecting line based on the behavior sequence.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 1:
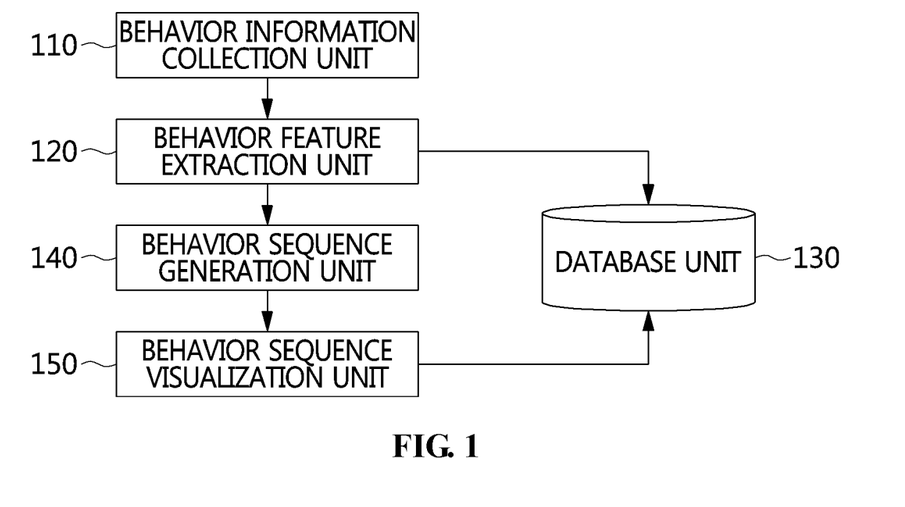
FIG. 1 is a block diagram that shows an apparatus for visualizing data according to an embodiment of the present invention.

FIG. 1 is a block diagram that shows an apparatus for visualizing data according to an embodiment of the present invention.

Referring to FIG. 1, the apparatus for visualizing data according to an embodiment of the present invention includes a behavior information collection unit 110, a behavior feature extraction unit 120, a database unit 130, a behavior sequence generation unit 140, and a behavior sequence visualization unit 150.

The behavior information collection unit 110 may execute an application from which information is to be collected, and may collect behavior information from a process of the executed application.

Here, in order to generate a behavior sequence of an application, the behavior information collection unit 110 may first execute the corresponding application. When the application is executed, a process is created, and the process may call Application Programming Interfaces (APIs) of a system.

Here, the behavior information collection unit 110 may collect behavior information related to the behavior through which the process calls an API.

Here, the behavior information collection unit 110 may collect the behavior information using an API hooking method. Here, the API to be hooked may be predefined as a behavior feature, and may be stored in advance in the database unit 130.

The behavior feature extraction unit 120 may extract behavior features in the order in which the behavior information is called.

The database unit 130 may store behavior features, which are defined so as to correspond to the APIs.

The behavior sequence generation unit 140 may generate a behavior sequence by arranging the behavior features in chronological order.

For example, a behavior sequence may be in the form of text, such as Seq1="ABCDE~~".

The behavior sequence visualization unit 150 may visualize the behavior sequence as a 3D sequence object.

Here, the behavior sequence visualization unit 150 may include a feature object generation unit 151 and a feature object connection unit 152.

The feature object generation unit 151 may generate a 3D object corresponding to behavior features.

Here, the feature object generation unit 151 may generate a 3D object of an n-hedron (n is a natural number that is equal to or greater than 4) so as to correspond to the number (n) of behavior features.

Here, the feature object generation unit 151 may generate a 3D object of an n-hedron so as to correspond to the number (n) of behavior features stored in the database unit 130.

Here, the feature object generation unit 151 may map the behavior features to the respective faces of the 3D object.

Here, the feature object generation unit 151 may set any one of the vertices of the 3D object as a first point, which is equally applied to 3D objects.

Here, based on a behavior sequence, the feature object generation unit 151 may set the center point of the face to which a behavior feature of the behavior sequence is mapped, among the respective faces of the 3D object, as a second point.

Here, the feature object generation unit 151 may arbitrarily set the position at which a connecting line for connecting a behavior sequence meets the 3D object, but the set position may be fixed to the same position in all 3D objects.

Here, the feature object generation unit 151 may generate color values for the behavior features mapped to the respective faces of the 3D object.

That is, the feature object generation unit 151 may generate the 3D object using the color values corresponding to the behavior features.

Here, the feature object generation unit 151 specifies a color value for a feature, whereby a feature object for which a color is specified may be easily identified. Of course, the form of a sequence may be characterized even when no color is specified so the same color is used.

The feature object connection unit 152 may generate a 3D sequence object by connecting two or more 3D objects based on a behavior sequence.

Here, the feature object connection unit 152 may connect the origin of a 3D coordinate system with the first point of the 3D object, based on the behavior sequence, using a connecting line.

Here, the feature object connection unit 152 divides a connection angle of 360 degrees by the number of behavior sequences to be represented, whereby the 3D objects may be connected using connecting lines at the position corresponding to the connection angle resulting from the division in 3D space.

Here, based on the behavior sequence, the feature object connection unit 152 may connect the second point of a previous 3D object with the first point of the 3D object subsequent thereto, among the two or more 3D objects, using the connecting line.

For example, when a first 3D object for the first feature of the behavior sequence is connected with a second 3D object for the second feature thereof, the feature object connection unit 152 connects the connecting line of the second 3D object so as to be perpendicular to the face to which the first feature is mapped, among the faces of the first 3D object. That is, the sequence in which features corresponding to faces that meet the connecting line are listed may be the behavior sequence.

Here, the feature object connection unit 152 may visualize behavior pattern information for 3D objects having the same behavior sequence corresponding to a connection of the two or more 3D objects in the 3D sequence object.

Here, the feature object connection unit 152 connects the 3D object to the unique face of the feature, whereby the angle at which each behavior feature is connected may vary.

Consequently, the 3D sequence object formed by connecting 3D objects may have a different shape depending on the behavior sequence. That is, the 3D sequence object according to an embodiment of the present invention has a different shape because a bend or a slope thereof varies depending on the order in which behavior features are listed in the behavior sequence, whereby the pattern of a behavior sequence and behavior pattern information may be visualized.

Here, the feature object connection unit 152 may visualize the behavior pattern information based on the connection angle at which the two or more 3D objects are connected.

Furthermore, the feature object connection unit 152 may visualize the behavior pattern information in consideration of the color values of the behavior feature as well as the connection angle.

Figure 2:
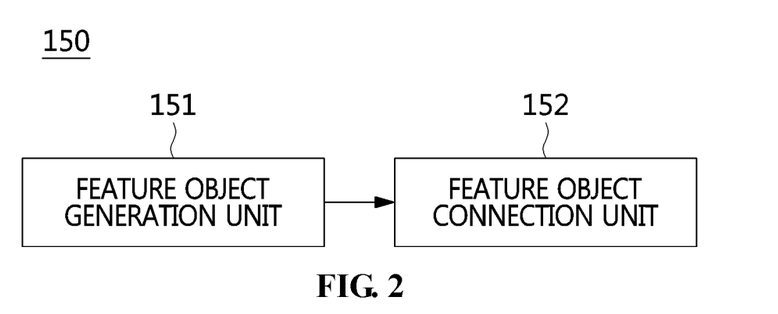
FIG. 2 is a block diagram that specifically shows an example of the behavioral sequence visualization unit illustrated in FIG. 1.

FIG. 2 is a block diagram that specifically shows an example of the behavior sequence visualization unit illustrated in FIG. 1.

Referring to FIG. 2, the behavior sequence visualization unit 150 may include a feature object generation unit 151 and a feature object connection unit 152.

The feature object generation unit 151 may generate a 3D object corresponding to behavior features.

Here, the feature object generation unit 151 may generate a 3D object of an n-hedron (n is a natural number that is equal to or greater than 4) so as to correspond to the number (n) of behavior features.

Here, the feature object generation unit 151 may generate a 3D object of an n-hedron so as to correspond to the number (n) of behavior features stored in the database unit 130.

Here, the feature object generation unit 151 may map the behavior features to the respective faces of the 3D object.

Here, the feature object generation unit 151 may set any one of the vertices of the 3D object as a first point, which is equally applied to 3D objects.

Here, the feature object generation unit 151 may set the center point of the face to which a behavior feature of the behavior sequence is mapped, among the respective faces of the 3D object, as a second point.

Here, the feature object generation unit 151 may arbitrarily set the position at which a connecting line for connecting a behavior sequence meets the 3D object, but the set position may be fixed to the same position in all 3D objects.

Here, the feature object generation unit 151 may generate color values for the behavior features mapped to the respective faces of the 3D object.

That is, the feature object generation unit 151 may generate the 3D object using the color values corresponding to the behavior features. Here, the feature object generation unit 151 specifies a color value for a feature, whereby a feature object for which a color is specified may be easily identified. Of course, the form of a sequence may be characterized even when no color is specified so the same color is used.

The feature object connection unit 152 may generate a 3D sequence object by connecting two or more 3D objects based on a behavior sequence.

Here, the feature object connection unit 152 may connect the origin of a 3D coordinate system with the first point of the 3D object, based on the behavior sequence, using a connecting line.

Here, the feature object connection unit 152 divides a connection angle of 360 degrees by the number of behavior sequences to be represented, whereby the 3D objects may be connected using connecting lines at the position corresponding to the connection angle resulting from the division in 3D space.

Here, based on the behavior sequence, the feature object connection unit 152 may connect the second point of a previous 3D object with the first point of the 3D object subsequent thereto, among the two or more 3D objects, using the connecting line.

For example, when a first 3D object for the first feature of the behavior sequence is connected with a second 3D object for the second feature thereof, the feature object connection unit 152 connects the connecting line of the second 3D object so as to be perpendicular to the face to which the first feature is mapped, among the faces of the first 3D object. That is, the sequence in which features corresponding to faces that meet the connecting line are listed may be the behavior sequence.

Here, the feature object connection unit 152 may visualize behavior pattern information for 3D objects having the same behavior sequence corresponding to a connection of the two or more 3D objects in the 3D sequence object.

Here, the feature object connection unit 152 connects the 3D object to the unique face of the feature, whereby the angle at which each behavior feature is connected may vary.

Consequently, the 3D sequence object formed by connecting 3D objects may have a different shape depending on the behavior sequence. That is, the 3D sequence object according to an embodiment of the present invention has a different shape because a bend or a slope thereof varies depending on the order in which behavior features are listed in the behavior sequence, whereby the pattern of a behavior sequence and behavior pattern information may be visualized.

Here, the feature object connection unit 152 may visualize the behavior pattern information based on the connection angle at which the two or more 3D objects are connected.

Furthermore, the feature object connection unit 152 may visualize the behavior pattern information in consideration of the color values of the behavior feature as well as the connection angle.

Figure 3:
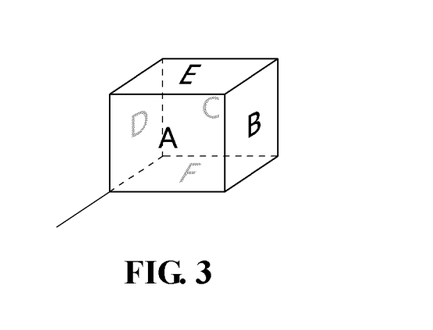
FIG. 3 is a view that shows a 3D hexahedral object according to an embodiment of the present invention.

FIG. 3 is a view that shows a 3D hexahedral object according to an embodiment of the present invention.

FIG. 3 shows that behavior features are mapped to the respective faces of the 3D hexahedral object according to an embodiment of the present invention. Here, because the behavior features may have their own positions, a 3D hexahedral object is necessary in order to map the behavior features A, B, C, D, E and F (n=6) to the respective faces of the 3D object. Here, the position of a connecting line for the connection of a behavior sequence may be arbitrarily determined, but the position of the connecting line must be fixed to the same position in all 3D objects. As illustrated in FIG. 3, the position of a connecting line may be fixed to the intersection of three faces A, D and F of the 3D object.

Also, the 3D object may be configured such that a unique color may be specified for each behavior feature. For example, red may be specified for feature object A, blue may be specified for feature object B, and the like, whereby a feature object may be more easily identified.

Figure 4:
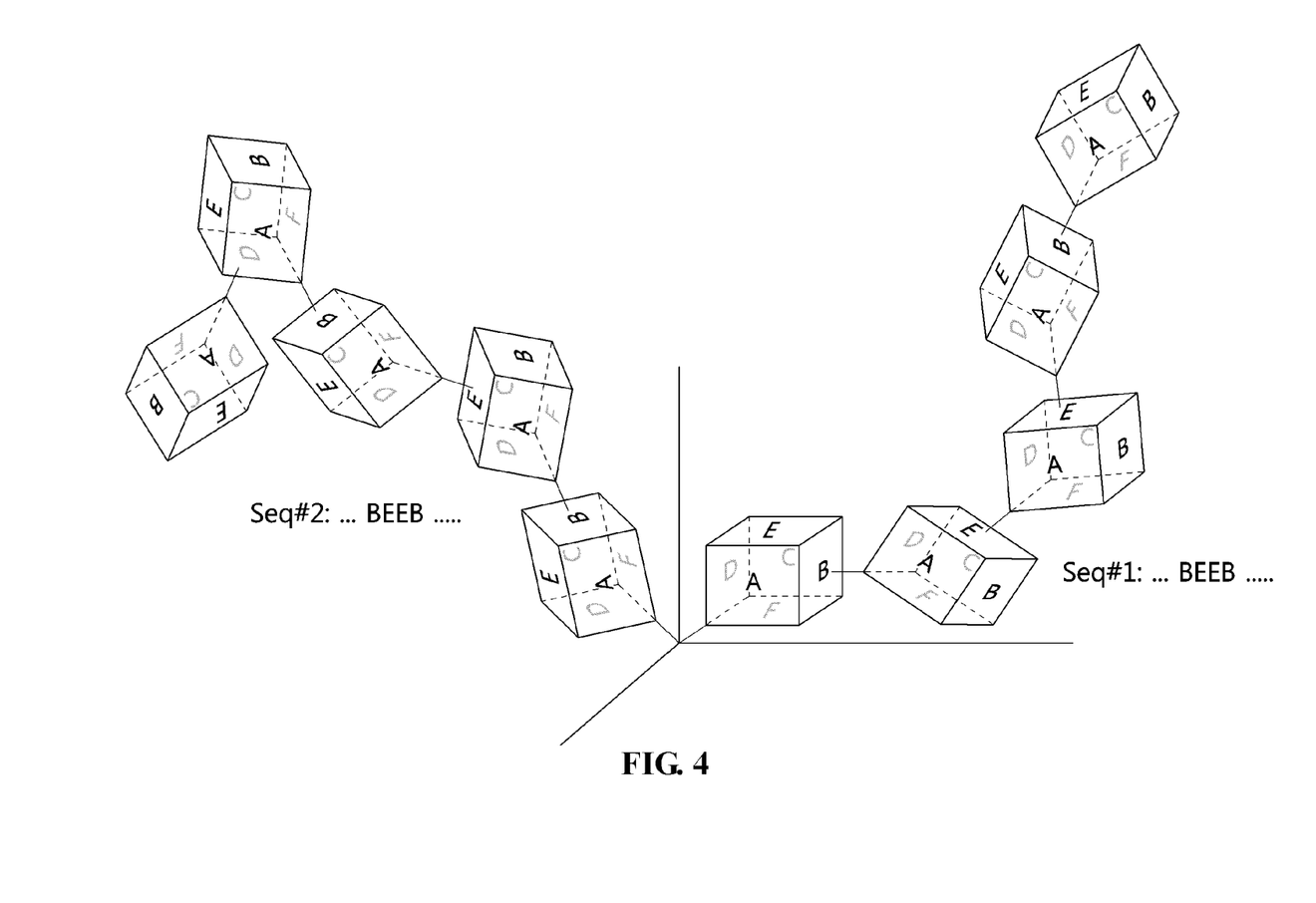
FIG. 4 is a view that shows a 3D sequence object formed by connecting the 3D hexahedral objects illustrated in FIG. 3.

FIG. 4 is a view that shows a 3D sequence object formed by connecting the 3D hexahedral objects illustrated in FIG. 3.

Referring to FIG. 4, the 3D sequence object according to an embodiment of the present invention is visualized based on the behavior sequence Seq#1: BEEB . . . , and the behavior sequence Seq#2: BEBD . . . .

Here, in the behavior sequence Seq#1, the intersection of the faces A, D and F of the first 3D object is connected with the origin of coordinates. Next, because the first behavior feature is GB', the face 'B' of the first 3D object is connected with the intersection of the faces A, D and F of the second 3D object, the face 'E' of the second 3D object is connected with the intersection of the faces A, D and F of the third 3D object, and this process is repeated, whereby the 3D sequence object for the behavior sequence is visualized.

Figure 5:
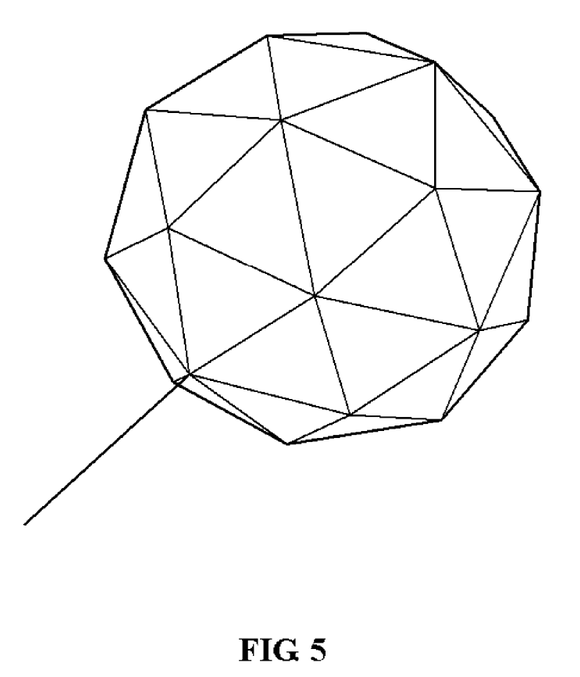
FIG. 5 is a view that shows a 3D icosahexahedral object according to an embodiment of the present invention.

FIG. 5 is a view that shows a 3D icosahexahedral object according to an embodiment of the present invention.

Referring to FIG. 5, the 3D icosahexahedral object according to an embodiment of the present may be generated because the number of behavior features is 26.

When a 3D polyhedral object is generated, the respective faces thereof may have different areas. Also, with the increase in the number of behavior features, the shape of the 3D object may become close to a sphere.

In the case of 3D polyhedral objects, the connection angle at which the objects are connected may be smaller with an increase in the number of faces, but because the connection angle may vary depending on the order in which behavior features are listed in the behavior sequence, a 3D sequence object may be visualized depending on the behavior sequence.

Figure 6:
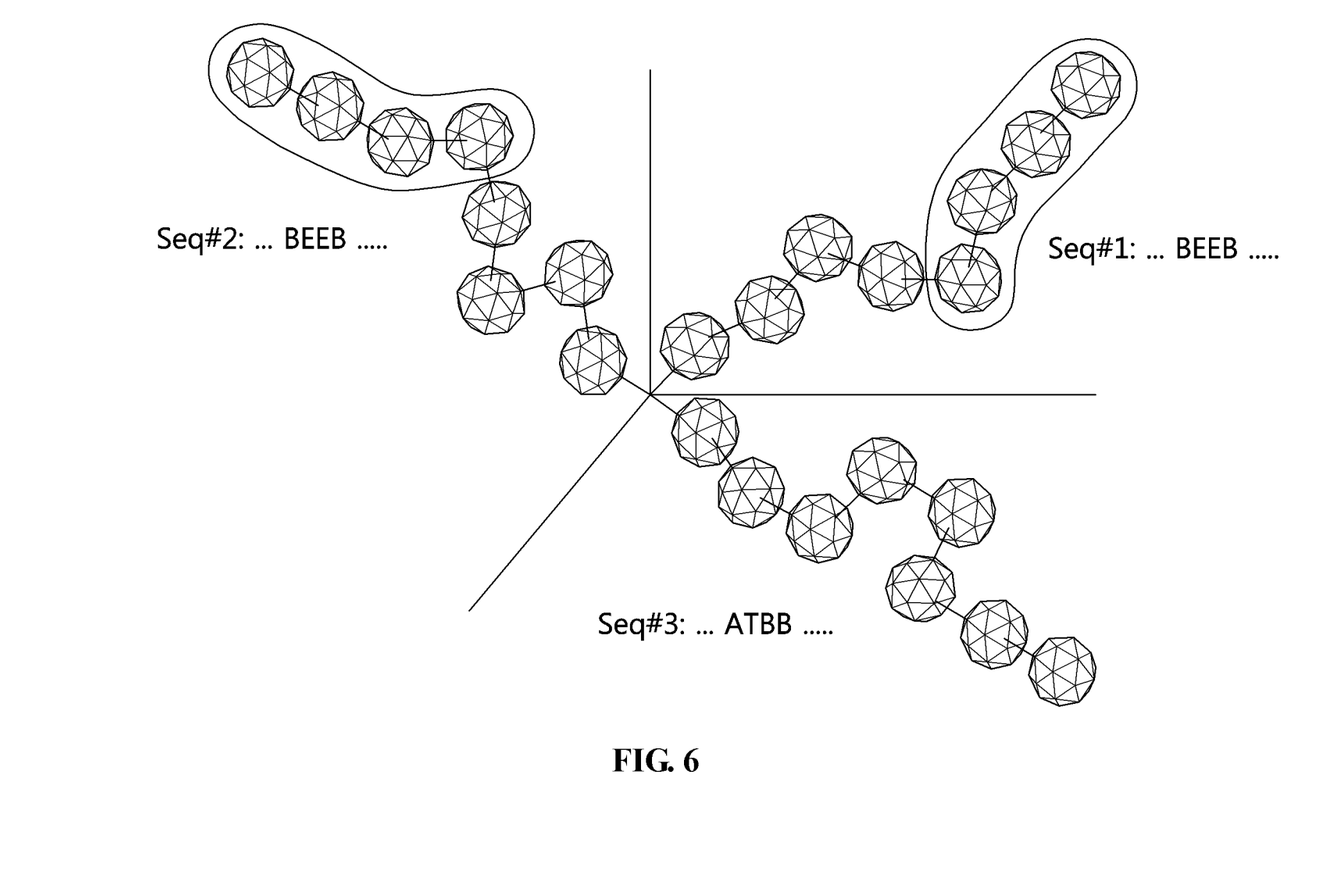
FIG. 6 is a view that shows a 3D sequence object formed by connecting the 3D icosahexahedral objects illustrated in FIG. 5.

FIG. 6 is a view that shows a 3D sequence object formed by connecting the 3D icosahexahedral objects illustrated in FIG. 5.

Referring to FIG. 6, the 3D sequence object according to an embodiment of the present invention is formed by visualizing three behavior sequences, and a part of the behavior sequence Seq#1, which is "BEEB", is the same as a part of the behavior sequence Seq#2.

Here, the apparatus and method for visualizing data may recognize the partial sequence Sub-seq="BEEB", which has the same 3D object connection angle both in Seq#1 and Seq#2, as a partial sequence common to Seq#1 and Seq#2, and may visualize behavior pattern information for representing specific behavior.

Figure 7:
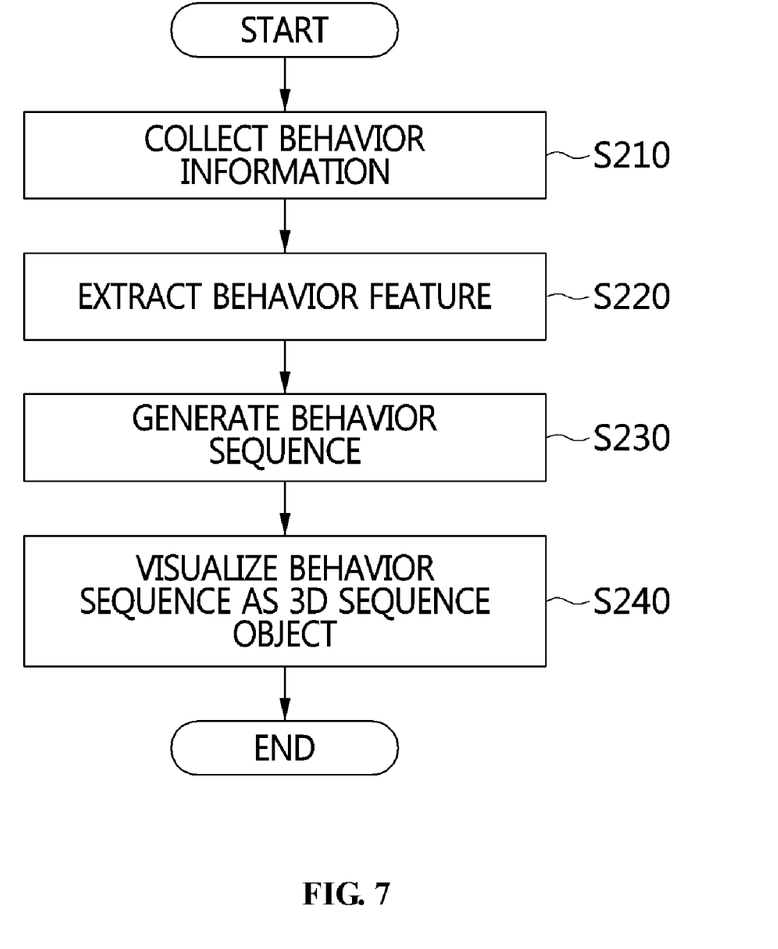
FIG. 7 is a flowchart that shows a method for visualizing data according to an embodiment of the present invention.

FIG. 7 is a flowchart that shows a method for visualizing data according to an embodiment of the present invention.

Referring to FIG. 7, in the method for visualizing data according to an embodiment of the present invention, first, behavior information may be collected at step S210.

That is, at step S210, an application from which information is to be collected is executed, and behavior information may be collected from the process of the executed application.

Here, at step S210, in order to generate the behavior sequence of an application, the application may be executed first. When the application is executed, a process is created, and the process may call Application Programming Interfaces (APIs) of a system.

Here, at step S210, the behavior information related to behavior through which the process calls an API may be collected.

Here, at step S210, the behavior information may be collected using an API hooking method. Here, the API to be hooked may be predefined as a behavior feature and stored in advance in the database unit 130.

Also, in the method for visualizing data according to an embodiment of the present invention, a behavior feature may be extracted at step S220.

That is, at step S220, behavior features may be extracted in the order in which the behavior information is called.

Also, in the method for visualizing data according to an embodiment of the present invention, a behavior sequence may be generated at step S230.

That is, at step S230, a behavior sequence may be generated by arranging the behavior features in chronological order.

For example, the behavior sequence may be in the form of text, such as Seq1="ABCDE~~".

Also, in the method for visualizing data according to an embodiment of the present invention, a 3D sequence object may be visualized at step S240.

That is, at step S240, the behavior sequence may be visualized as a 3D sequence object.

Here, at step S240, first, a 3D object may be generated at step S241.

That is, a 3D object corresponding to behavior features may be generated at step S241.

Here, at step S241, a 3D object of an n-hedron (n is a natural number that is equal to or greater than 4) may be generated so as to correspond to the number (n) of behavior features.

Here, at step S241, a 3D object of an n-hedron may be generated so as to correspond to the number (n) of behavior features stored in the database unit 130.

Here, at step S241, the behavior features may be mapped to the respective faces of the 3D object.

Here, at step S241, any one of the vertices of the 3D object may be set as a first point, which is equally applied to all 3D objects.

Here, at step S241, the face to which a behavior feature of the behavior sequence is mapped is selected from among the faces of the 3D object, and the center point of the selected face may be set as a second point.

Here, at step S241, the position at which a connecting line for connecting a behavior sequence meets the 3D object may be arbitrarily set, but the position may be fixed to the same position in all 3D objects.

Here, at step S241, color values for the behavior features, which are mapped to the respective faces of the 3D object, may be generated.

That is, at step S241, the 3D object may be generated using the color values corresponding to the behavior features.

Here, at step S241, a color value is specified for a feature, whereby a feature object for which a color is specified may be easily identified. Of course, the form of a sequence may be characterized even when no color is specified so the same color is used.

Also, at step S240, a 3D sequence object may be generated at step S242.

That is, at step S242, a 3D sequence object may be generated by connecting two or more 3D objects based on a behavior sequence.

Here, at step S242, the origin of a 3D coordinate system may be connected with the first point of the 3D object, based on the behavior sequence, using a connecting line.

Here, at step S242, a connection angle of 360 degrees is divided by the number of behavior sequences to be represented, whereby the 3D objects may be connected using connecting lines at the position corresponding to the connection angle resulting from the division in 3D space.

Here, at step S242, among the two or more 3D objects, the second point of a previous 3D object and the first point of the 3D object subsequent thereto may be connected with each other using a connecting line based on the behavior sequence.

For example, at step S242, when a first 3D object for the first feature of the behavior sequence is connected with a second 3D object for the second feature thereof, the connecting line of the second 3D object is connected so as to be perpendicular to the face to which the first feature is mapped, among the faces of the first 3D object. That is, the sequence in which features corresponding to faces that meet the connecting line are listed may be the behavior sequence.

Here, in the 3D sequence object, behavior pattern information for 3D objects having the same behavior sequence corresponding to a connection of the two or more 3D objects may be visualized at step S242.

Here, at step S242, the 3D object is connected to the unique face of the feature, whereby the angle at which each behavior feature is connected may vary.

Consequently, the 3D sequence object formed by connecting 3D objects may have a different shape depending on the behavior sequence. That is, the 3D sequence object according to an embodiment of the present invention has a different shape because a bend or a slope thereof varies depending on the order in which behavior features are listed in the behavior sequence, whereby the pattern of a behavior sequence and behavior pattern information may be visualized.

Here, at step S242, the behavior pattern information may be visualized based on the connection angle at which the two or more 3D objects are connected.

Furthermore, at step S242, the behavior pattern information may be visualized in consideration of the color value of the behavior feature as well as the connection angle.

Figure 8:
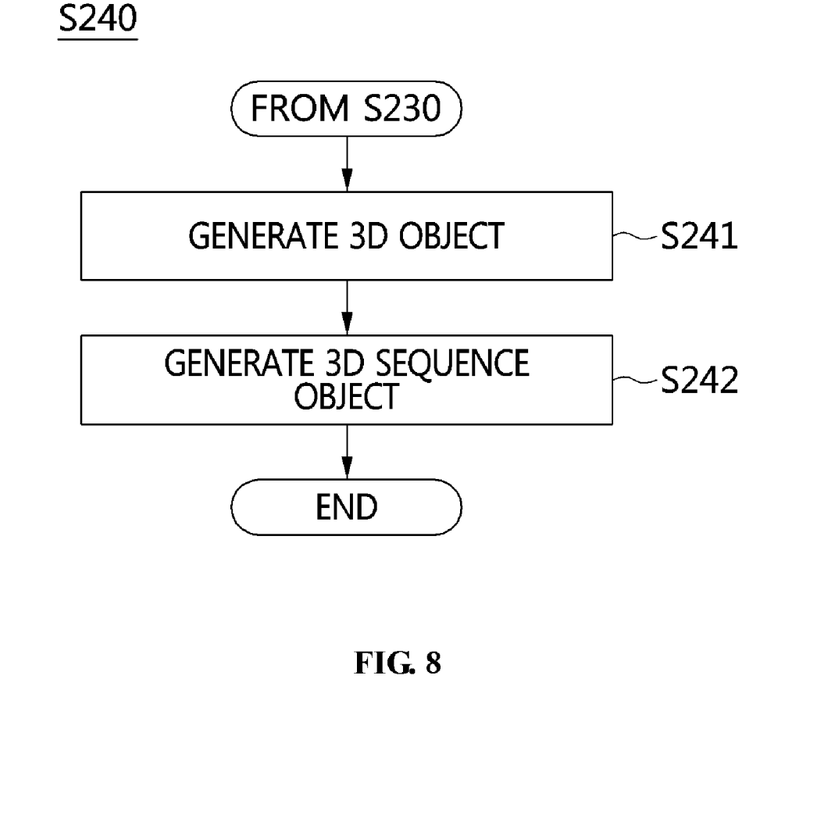
FIG. 8 is a flowchart that specifically shows an example of the step of visualizing a 3D sequence object illustrated in FIG. 7.

FIG. 8 is a flowchart that specifically shows an example of the step of visualizing a 3D sequence object illustrated in FIG. 7.

Referring to FIG. 8, a 3D object corresponding to behavior features may be generated at step S241.

Here, at step S241, a 3D object of an n-hedron (n is a natural number that is equal to or greater than 4) may be generated so as to correspond to the number (n) of behavior features.

Here, at step S241, a 3D object of an n-hedron may be generated so as to correspond to the number (n) of behavior features stored in the database unit 130.

Here, at step S241, the behavior features may be mapped to the respective faces of the 3D object.

Here, at step S241, any one of the vertices of the 3D object may be set as a first point, which is equally applied to all 3D objects.

Here, at step S241, the face to which a behavior feature of the behavior sequence is mapped is selected from among the faces of the 3D object, and the center point of the selected face may be set as a second point.

Here, at step S241, the position at which a connecting line for connecting a behavior sequence meets the 3D object may be arbitrarily set, but the position may be fixed to the same position in all 3D objects.

Here, at step S241, color values for the behavior features, which are mapped to the respective faces of the 3D object, may be generated.

Here, at step S241, a color value is specified for a feature, whereby a feature object for which a color is specified may be easily identified. Of course, the form of a sequence may be characterized even when no color is specified so the same color is used.

Also, at step 240, a 3D sequence object may be generated at step S242.

That is, at step S242, a 3D sequence object may be generated by connecting two or more 3D objects based on a behavior sequence.

Here, at step S242, the origin of a 3D coordinate system may be connected with the first point of the 3D object, based on the behavior sequence, using a connecting line.

Here, at step S242, a connection angle of 360 degrees is divided by the number of behavior sequences to be represented, whereby the 3D objects may be connected using connecting lines at positions corresponding to the connection angles resulting from the division in 3D space.

Here, at step S242, among the two or more 3D objects, the second point of a previous 3D object and the first point of the 3D object subsequent thereto may be connected with each other using a connecting line based on the behavior sequence.

For example, at step S242, when a first 3D object for the first feature of the behavior sequence and a second 3D object for the second feature thereof are connected with each other, the connecting line of the second 3D object is connected so as to be perpendicular to the face to which the first feature is mapped, among the faces of the first 3D object. That is, the sequence in which features corresponding to faces that meet the connecting line are listed may be the behavior sequence.

Here, in the 3D sequence object, behavior pattern information for 3D objects having the same behavior sequence corresponding to a connection of the two or more 3D objects may be visualized at step S242.

Here, at step S242, the 3D object is connected to the unique face of the feature, whereby the angle at which each behavior feature is connected may vary.

Consequently, the 3D sequence object formed by connecting 3D objects may have a different shape depending on the behavior sequence. That is, the 3D sequence object according to an embodiment of the present invention has a different shape because a bend or a slope thereof varies depending on the order in which behavior features are listed in the behavior sequence, whereby the pattern of a behavior sequence and behavior pattern information may be visualized.

Here, at step S242, the behavior pattern information may be visualized based on the connection angle at which the two or more 3D objects are connected.

Furthermore, at step S242, the behavior pattern information may be visualized in consideration of the color value of the behavior feature as well as the connection angle.

Figure 9:
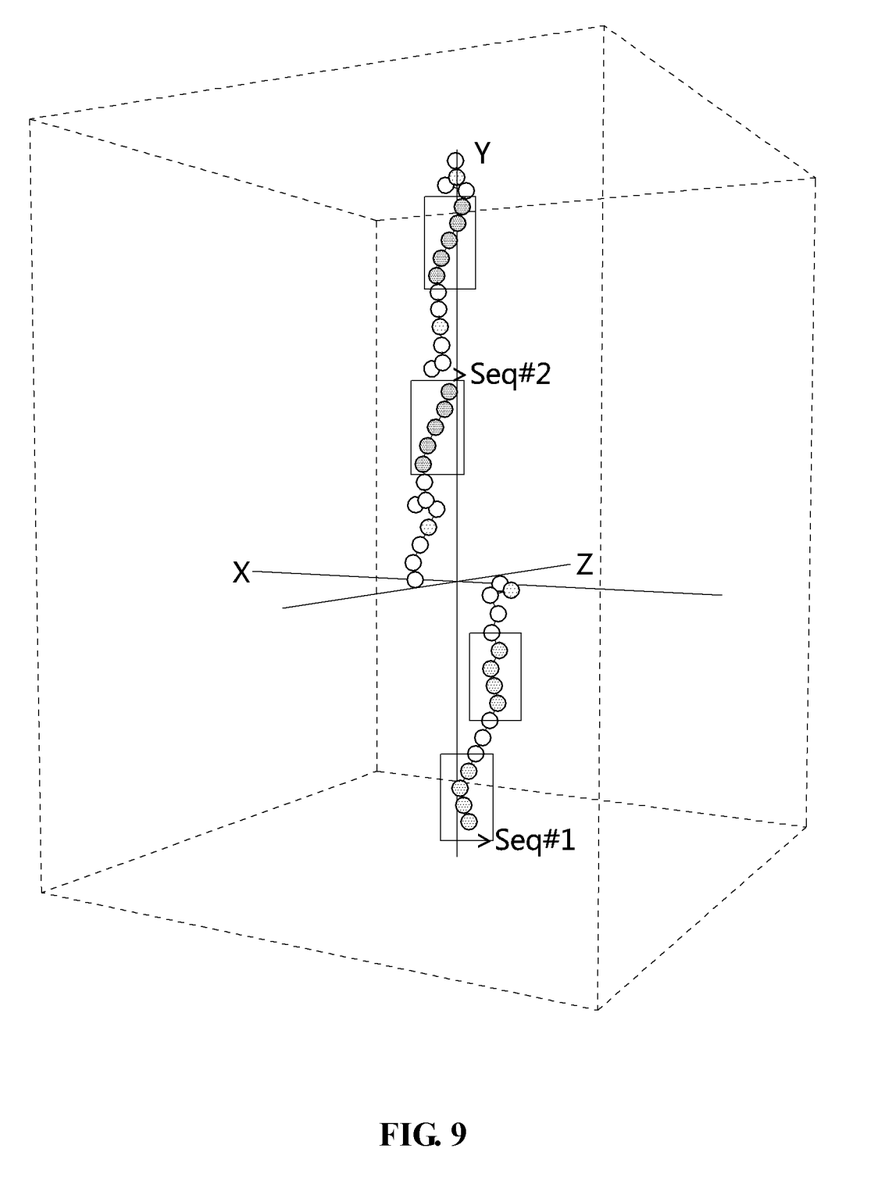
FIG. 9 is a view that shows a 3D sequence object including two sequences according to an embodiment of the present invention.

FIG. 9 is a view that shows a 3D sequence object including two sequences according to an embodiment of the present invention.

Referring to FIG. 9, a 3D sequence object is visualized by specifying colors for 56 behavior feature objects. Here, 52 characters, namely uppercase letters 'A' to 'Z' and lowercase letters 'a' to 'z', and four special characters are defined as features.

Here, the 3D sequence object may be represented as two behavior sequences, in which Seq#1="ZTFAFBEEBCCCBEEB" and Seq#2="ACCCZTFAEDDEEZTFAFFFEDDEEZTFA".

Here, in the behavior sequence Seq#1, which is depicted in the lower part of the 3D sequence object, the partial sequence in the two boxes may be set to Sub-seq#1="BEEB". Also, in the behavior sequence Seq#2, which is depicted in the upper part of the 3D sequence object, the partial sequence in the two boxes may be set to Sub-seq#2="EDDEE".

Figure 10:
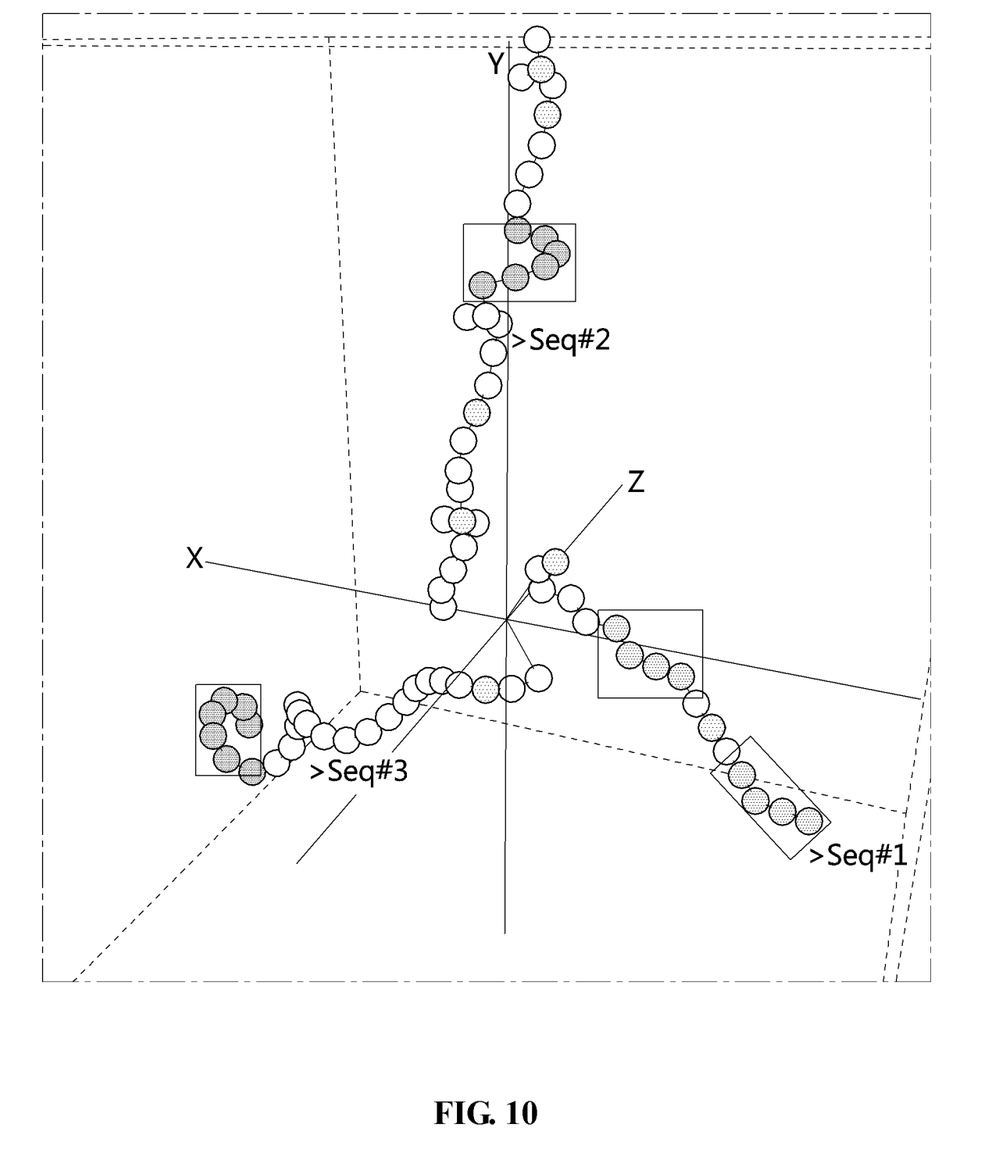
FIG. 10 is a view that shows a 3D sequence object including three sequences according to an embodiment of the present invention.

FIG. 10 is a view that shows a 3D sequence object including three sequences according to an embodiment of the present invention.

Referring to FIG. 10, the 3D sequence object may include three object sequences Seq#1, Seq#2 and Seq#3.

Here, the behavior sequence Seq#1 is the same as the behavior sequence Seq#1 of the 3D sequence object illustrated in FIG. 9, the behavior sequence Seq#2 is modified from the behavior sequence Seq#2 of the 3D sequence object illustrated in FIG. 9, and the behavior sequence Seq#3 is newly added.

Here, unlike Seq#1 and Seq#2, the behavior sequence Seq#3 has a spiral twist. This is because the behavior sequence is represented at a connection position that is unique for each behavior feature.

Here, the partial sequence of the behavior sequence Seq#2 depicted as being in the box and the partial sequence of the behavior sequence Seq#3 depicted as being in the box may be the same partial sequence Sub-seq="UVWX".

That is, the 3D sequence object illustrated in FIG. 10 may include the behavior sequence Seq#1="ZTFAFBEEBCCCBEEB", the behavior sequence Seq#2="ACCCZTFAEDDEEZTFUVWXYADDEEZTFA", and the behavior sequence Seq#3="ABCDEFGHIJKLMNOPQRSTUVWXYZ".

Figure 11:
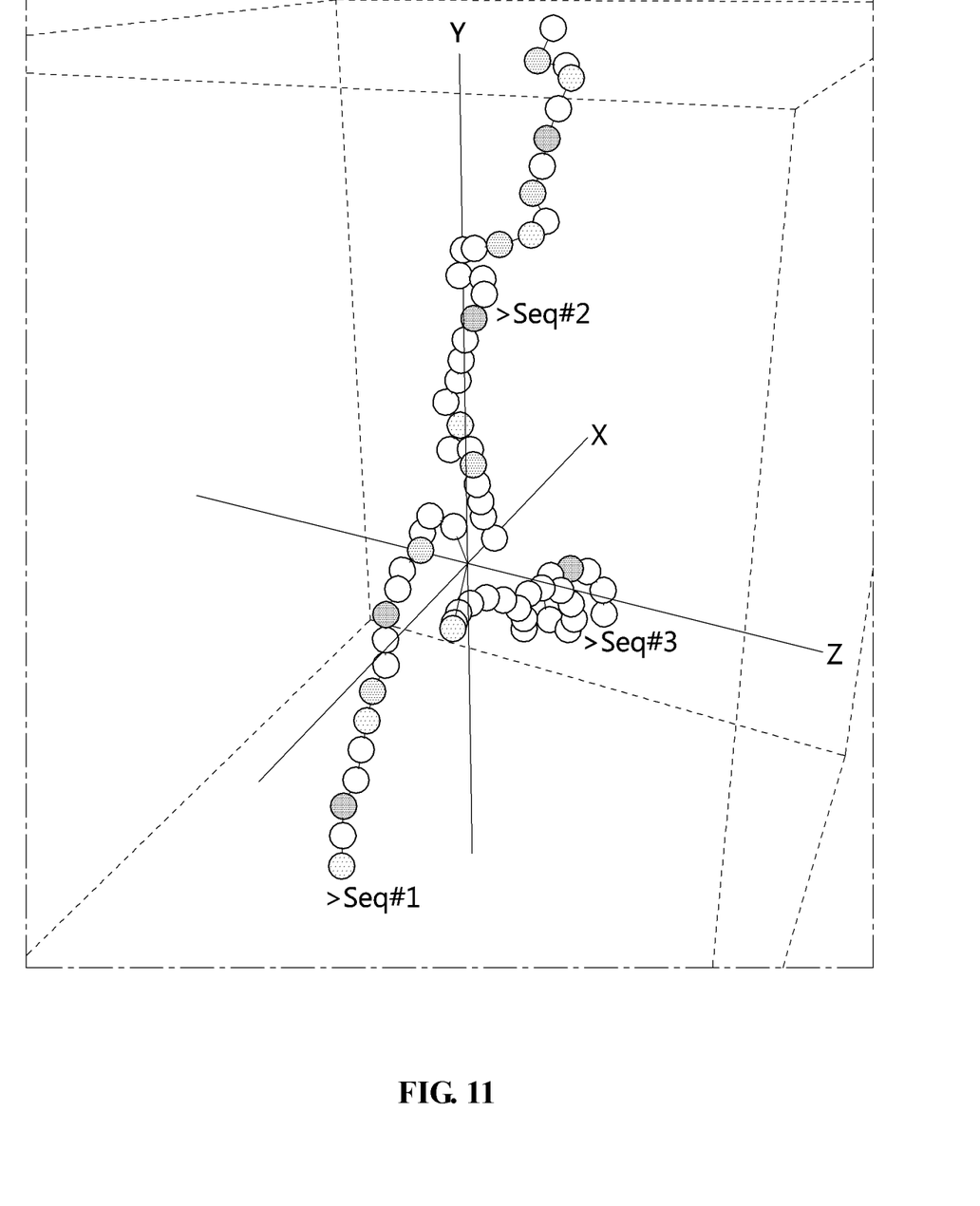
FIG. 11 is a view that shows the 3D sequence object in FIG. 10 viewed from a different viewpoint.

FIG. 11 is a view that shows the 3D sequence object in FIG. 10 viewed from a different viewpoint.

Referring to FIG. 11, the 3D sequence object in FIG. 10 is viewed from a viewpoint that is rotated relative to the viewpoint of FIG. 10. That is, the 3D sequence object may be visualized such that the shape and the characteristics thereof may be observed from different angles by rotating a coordinate axis in 3D space.

As illustrated in FIGS. 9 to 11, it is easily understood that the shapes of behavior sequences differ from each other depending on the order in which behavior features constituting the 3D sequence object are listed.

Also, whether a specific behavior sequence pattern is present may be detected depending on whether the same partial sequence is present in behavior sequences.

Accordingly, the present invention is useful to represent not only colors but also specific behavior sequence patterns when a behavior sequence is visualized.

Furthermore, because the present invention enables a specific behavior sequence pattern to be easily detected, the behavior sequence of data may be analyzed based on behavior pattern information, whereby a specific pattern of malicious code and whether malicious code is present may be detected.

Figure 12:
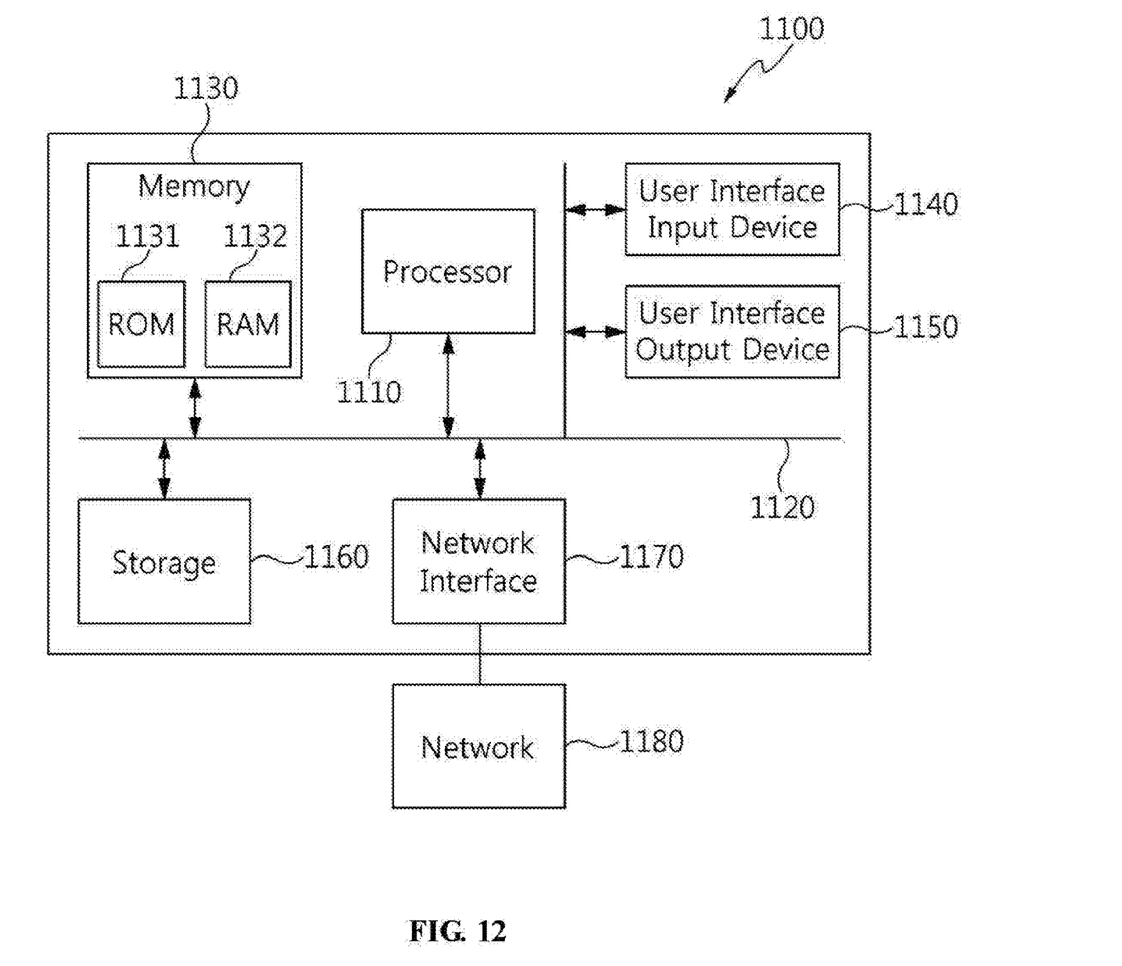
FIG. 12 is a block diagram that shows a computer system according to an embodiment of the present invention.

FIG. 12 is a block diagram that shows a computer system according to an embodiment of the present invention.

Referring to FIG. 12, an embodiment of the present invention may be implemented in a computer system 1100 including a computer-readable recording medium. As illustrated in FIG. 12, the computer system 1100 may include one or more processors 1110, memory 1130, a user interface input device 1140, a user interface output device 1150 and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

The present invention may specify a behavior sequence by visualizing the behavior sequence of sequential data.

Also, the present invention may provide a method for representing a behavior sequence of data as a 3D object, whereby the similarity between behavior sequences may be intuitively determined.

Also, the present invention may provide a means for detecting malicious code between sequences by visualizing a unique behavior sequence pattern of malicious code in the field of malicious code classification and detection.

As described above, the apparatus and method for visualizing data according to the present invention are not limitedly applied to the configurations and operations of the above-described embodiments, but all or some of the embodiments may be selectively combined and configured, so that the embodiments may be modified in various ways.

What is claimed is:

1. An apparatus for visualizing data, comprising:
a behavior information collection unit for executing an application from which information is to be collected and collecting behavior information from a process of the executed application;
a behavior feature extraction unit for extracting behavior features in an order in which the behavior information is called;
a behavior sequence generation unit for generating a behavior sequence by arranging the behavior features in chronological order; and
a behavior sequence visualization unit for visualizing the behavior sequence as a 3D sequence object.

2. The apparatus of claim 1, wherein the behavior information collection unit collects the behavior information related to behavior through which the process calls an Application Programming Interface (API).

3. The apparatus of claim 2, further comprising:
a database unit for storing a behavior feature that is defined so as to correspond to the API.

4. The apparatus of claim 3, wherein the behavior information collection unit collects the behavior information using an API hooking method.

5. The apparatus of claim 4, wherein the behavior sequence visualization unit comprises:
a feature object generation unit for generating a 3D object corresponding to the behavior features; and
a feature object connection unit for generating the 3D sequence object by connecting two or more 3D objects based on the behavior sequence.

6. The apparatus of claim 5, wherein the feature object generation unit generates a 3D object of an n-hedron (n is a natural number that is equal to or greater than 4) so as to correspond to a number (n) of behavior features.

7. The apparatus of claim 6, wherein the feature object generation unit maps the behavior features to respective faces of the 3D object.

8. The apparatus of claim 7, wherein the feature object generation unit sets any one of vertices of the 3D object as a first point, which is equally applied to all of the two or more 3D objects.

9. The apparatus of claim 8, wherein the feature object generation unit sets a center point of a face to which a behavior feature of the behavior sequence is mapped, among the faces of the 3D object, as a second point.

10. The apparatus of claim 9, wherein the feature object generation unit generates color values for the behavior features mapped to the respective faces of the 3D object.

11. The apparatus of claim 10, wherein the feature object connection unit connects an origin of a 3D coordinate system with the first point of the 3D object, based on the behavior sequence, using a connecting line.

12. The apparatus of claim 11, wherein, based on the behavior sequence, the feature object connection unit connects the second point of a previous 3D object with the first point of a 3D object subsequent thereto, among the two or more 3D objects, using the connecting line.

13. The apparatus of claim 12, wherein the feature object connection unit visualizes behavior pattern information for 3D objects having a same behavior sequence corresponding to a connection of the two or more 3D objects in the 3D sequence object.

14. The apparatus of claim 13, wherein the feature object connection unit visualizes the behavior pattern information based on a connection angle at which the two or more 3D objects are connected.

15. A method for visualizing data, in which an apparatus for visualizing data is used, comprising:
executing an application from which information is to be collected and collecting behavior information from a process of the executed application;
extracting behavior features in an order in which the behavior information is called;
generating a behavior sequence by arranging the behavior features in chronological order; and
visualizing the behavior sequence as a 3D sequence object.

16. The method of claim 15, wherein visualizing the behavior sequence comprises:
generating a 3D object corresponding to the behavior features; and
generating the 3D sequence object by connecting two or more 3D objects based on the behavior sequence.

17. The method of claim 16, wherein generating the 3D object is configured to set any one of vertices of the 3D object as a first point, which is equally applied to all of the two or more 3D objects.

18. The method of claim 17, wherein generating the 3D object is configured to set a center point of a face to which a behavior feature of the behavior sequence is mapped, among respective faces of the 3D object, as a second point.

19. The method of claim 18, wherein generating the 3D sequence object is configured to connect an origin of a 3D coordinate system with the first point of the 3D object, based on the behavior sequence, using a connecting line.

20. The method of claim 19, wherein generating the 3D sequence object is configured to connect the second point of a previous 3D object with the first point of a 3D object subsequent thereto, among the two or more 3D objects, using a connecting line based on the behavior sequence.

* * * * *